United States Patent [19]

Breuers et al.

[11] Patent Number: 5,602,218
[45] Date of Patent: Feb. 11, 1997

[54] PROCESS FOR THE PREPARATION OF A POLY-1-OLEFIN

[75] Inventors: Werner Breuers, Eppstein; Ludwig Böhm, Hattersheim; Rainer Lecht, Kelkheim, all of Germany

[73] Assignee: Hoechst Aktiengesellschaft, Germany

[21] Appl. No.: 333,858

[22] Filed: Nov. 3, 1994

[30] Foreign Application Priority Data

Nov. 6, 1993 [DE] Germany .................. 43 37 985.0

[51] Int. Cl.$^6$ .................................................. C08F 4/64
[52] U.S. Cl. .................. 526/159; 526/352; 526/901; 526/904; 502/5; 502/522
[58] Field of Search ................. 502/5, 522; 526/159

[56] References Cited

U.S. PATENT DOCUMENTS

| | | | |
|---|---|---|---|
| 4,180,636 | 12/1979 | Hirota et al. | 526/125 |
| 4,363,902 | 12/1982 | Kurz | 526/114 |
| 4,439,539 | 3/1984 | Takitani et al. | 502/112 |
| 4,442,225 | 4/1984 | Takitani et al. | 502/112 |
| 4,487,846 | 12/1984 | Bailly et al. | 502/154 |
| 4,731,227 | 3/1988 | Pulvari | 502/126 |
| 4,946,816 | 8/1990 | Cohen et al. | 502/126 |

FOREIGN PATENT DOCUMENTS

| | | |
|---|---|---|
| 640488 | 6/1990 | Australia . |
| 79082/91 | 1/1992 | Australia . |
| 1297233 | 10/1992 | Canada . |
| 0257131 | 3/1988 | European Pat. Off. . |

OTHER PUBLICATIONS

Database WPI Derwent Publications Ltd., London, GB; AN 79-36804B POPOV 'ReactionB essel for processes in heterogeneous medium & SU A 613,799 (Power Res Inst) 1 Jun. 1978.

*Primary Examiner*—David W. Wu
*Attorney, Agent, or Firm*—Connolly & Hutz

[57] ABSTRACT

A particularly uniform Ziegler catalyst in the form of spherical particles is obtained by using shock waves instead of a stirrer for the thorough mixing of the reactants. By means of this highly active catalyst based on a magnesium dialkyl, it is possible to obtain polymers in the form of spherical particles in the polymerization of alpha-olefins. A further advantage of the catalyst according to the invention is its high activity, which is such that only very small amounts of the catalyst are required for the polymerization. The residual content of titanium and/or zirconium in the polymers prepared according to the invention is less than 10 ppm. By virtue of its good responsiveness to hydrogen, the catalyst is suitable for the preparation of polymers with a broad bimodal molar mass distribution, particularly in two-stage processes. The replacement of sulfur-containing electron donors such as diethyl sulfite with alcohols such as ethanol has the effect of reducing the odor nuisance and increasing the number of possible uses of the polymer.

Considerable simplifications and advantages in handling, drying and processing are achieved as a result of the spherical shape of the particles and the very good flowability of the polymers and copolymers which is associated therewith.

17 Claims, 2 Drawing Sheets

PROCESS FOR THE PREPARATION OF A POLY-1-OLEFIN

The invention relates to a process for the preparation of a poly-1-olefin in the form of spherical particles by means of a highly active Ziegler catalyst in the form of spherical particles.

A large number of catalysts of the Ziegler type for the polymerization of alpha-olefins are already known. Many of these catalysts are based on magnesium chloride as the support, which is obtained by reacting an organomagnesium compound $R_2Mg$ with an organochlorine compound R'—Cl such as carbon tetrachloride (cf. U.S. Pat. No. 4,442,225, U.S. Pat. No. 4,439,539, DE 30 10 202).

However, this does not make it possible to obtain magnesium chloride in the form of spherical particles.

On the other hand, it is known that magnesium chloride in the form of spherical particles is produced by reacting an organomagnesium compound $R_2Mg$ with an organochlorine compound R'—Cl in the presence of an organoaluminum compound, such as aluminum triethyl, and an electron donor compound, such as diisoamyl ether (cf. EP 99 284). Restrictions here are that R' must be a hydrocarbon radical having three or more carbon atoms and that the carbon atom adjacent to the chlorine must be either a secondary or a tertiary carbon atom.

Processes are also known in which Ziegler catalysts in the form of spherical particles are produced by reacting an organomagnesium compound (e.g. ®BOMAG-A, Witco GmbH) with an organochlorine compound, an electron donor and a transition metal compound (cf. EP 249 869, WO 9 200 332). Electron donors are necessary in these cases in order to bond the transition metal component.

It has now been found that a highly active Ziegler catalyst in the form of spherical particles can be prepared by a process in which, in the reaction of an organomagnesium compound with an organochlorine compound and, if appropriate, an organoaluminum compound, a device for producing shock waves is used instead of a stirrer for mixing the reactants, and the reaction product is reacted with alcohols and a transition metal compound, it also being possible to dispense with the addition of the alcohol. It has further been found that the catalyst can be used to particular advantage in a gas phase polymerization process.

The invention thus relates to a process for the preparation of a polyolefin by the polymerization of alphaolefins at a temperature of 50° to 150° C. and at a pressure of 1 to 40 bar, in the presence of a catalyst composed of a transition metal component (component A) and an organometallic compound (component B), wherein component A has been prepared by a) reacting an organomagnesium compound of the formula $R^1_xMgR^2_{2-x}$, wherein $R^1$ and $R^2$ are identical or different alkyl radicals having 2 to 12 carbon atoms and x is a number between 0 and 2, with a primary aliphatic chlorohydrocarbon in an amount of 0.5 to 2.5 mol of chlorohydrocarbon, based on 1 mol of organomagnesium compound, and, if appropriate, an organoaluminum compound of the formula $AlR^3_n(OR^4)_{3-n}$, wherein $R^3$ and $R^4$ are identical or different alkyl radicals having 1 to 8 carbon atoms and n is 0, 1, 2 or 3, or the reaction product of aluminum trialkyls or aluminum dialkyl hydrides with diolefins containing 4 to 20 carbon atoms, at a temperature of 30° to 110° C., b) treating the resulting solid with an alcohol in an amount of 0.001 to 1 mol per gram atom of magnesium contained in the solid, at a temperature of −20° to 150° C., and c) reacting the resulting support with one or more compounds of the formula $M^1X_m(OR^5)_{4-m}$, wherein $M^1$ is titanium or zirconium, $R^5$ is an alkyl radical having 2 to 10 carbon atoms, X is a halogen atom and m is an integer from 0 to 4, in an amount of 0.1 to 5 mol per gram atom of magnesium contained in the support, at a temperature of 20° to 180° C., a device for producing shock waves being used instead of a stirrer in steps a), b) and c) for the thorough mixing of the reactants, or by carrying out steps a and c but not b, or by carrying out steps b and c simultaneously.

A solid in the form of spherical particles is initially produced. This is done by reacting an organomagnesium compound with an organic chlorine compound and, if appropriate, an organoaluminum compound, a device for producing shock waves being used instead of a stirrer in this and the following reaction steps for the thorough mixing of the reactants.

A shock wave generator, for example a device obtainable under the name ®Vibromischer E1 from Chemlab GmbH, is used as the device for producing shock waves.

The organomagnesium compound is a magnesium dialkyl of the formula $R^1_xMgR^2_{2-x}$, wherein $R^1$ and $R^2$ are identical or different alkyl radicals having 2 to 12 carbon atoms and x is a number between 0 and 2. Preferred magnesium dialkyls are magnesium di-n-butyl, magnesium di-n-octyl, magnesium n-butyl n-octyl, magnesium n-butyl ethyl and magnesium n-butyl sec-butyl or mixtures of these compounds. A magnesium dialkyl of the formula $[(n-C_4H_9)_{1.2-1.7}(n-C_8H_{17})_{0.3-0.8}Mg]$ is particularly preferred, $[(n-C_4H_9)_{1.5}(n-C_8H_{17})_{0.5}Mg]$ being very particularly preferred.

Examples of suitable primary aliphatic chlorhydrocarbons are carbon tetrachloride, trichloromethane, methylene chloride, 1-chloropropane or 1,1,1-trichloroethane, it also being possible to use mixtures. It is preferable to use trichloromethane and carbon tetrachloride.

A suitable organoaluminum compound is an aluminum alkyl or alkoxy compound of the formula $AlR^3_n(OR^4)_{3-n}$, wherein $R^3$ and $R^4$ are identical or different alkyl radicals having 1 to 8 carbon atoms and n is 0, 1, 2 or 3. The reaction product of aluminum trialkyls or aluminum dialkyl hydrides with diolefins containing 4 to 20 carbon atoms, preferably isoprene, is also suitable. Aluminum isoprenyl may be mentioned as an example.

For the preparation of the solid in the form of spherical particles, the organomagnesium compound and, if appropriate, the organoaluminum compound are dissolved in an inert liquid hydrocarbon under a nitrogen or argon atmosphere. This solution is brought into contact with a solution of the organochlorine compound at a temperature of 30° to 110° C., preferably of 40° to 80° C., with the aid of a device for producing shock waves. The reaction can be carried out in such a way that the organochlorine compound is added to the solution of the organomagnesium compound in the liquid hydrocarbon, or vice-versa.

In this reaction, both the reaction time and the degree of dilution of the reactants and the intensity of the shock waves for mixing the reactants can be varied within wide limits. The reaction time is 30 min to several hours, preferably 1 hour to 5 hours. The reactants are used as 0.5 to 15 molar solutions.

The reaction mixture contains up to 2.5 mol, preferably up to 2.0 mol, of organochlorine compound, based on one mol of organomagnesium compound.

A suspension of a solid in the form of spherical particles is produced. The suspension is passed to the next reaction step without further washing steps, although the solid can also first be isolated in the dried form, stored and resuspended for further processing at a later stage.

An aliphatic alcohol is added to the suspension of the solid formed of spherical particles. The alcohol is added to the solid in a molar ratio of 0.001 to 1 mol, preferably 0.01 to 0.5 mol, based on one gram atom of magnesium, at a temperature of −20° to 150° C., preferably 20° to 90° C. The reaction time is 0.1 to 3 hours, preferably up to 1 h, depending on the reactivity of the reactants.

Aliphatic or cycloaliphatic alcohols or alcohols having several hydroxyl groups are used, examples being methanol, ethanol, n-propanol, i-propanol, n-butanol, sec-butanol, t-butanol, pentanols, hexanols, amyl alcohol, ethylhexanol, glycol, glycerol and cyclohexanol. It is particularly preferable to use ethanol and n-butanol.

The support obtained in this way, in the form of spherical particles, is reacted under a nitrogen or argon atmosphere with a transition metal compound of the formula $M^1X_m(OR^5)_{4-m}$, wherein $M^1$ is titanium or zirconium, $R^5$ is an alkyl radical having 2 to 10 carbon atoms, X is a halogen atom, preferably chlorine, and m is an integer from 0 to 4, but preferably 2 or 4. It is possible to use a mixture of several of these compounds or several of these compounds in succession. A further possibility is the parallel addition of alcohol and one or more compounds of the type $M^1X_m(OR^5)_{4-m}$.

Examples of preferred compounds are $TiCl_4$, $TiCl_3(OC_2H_5)$, $TiCl_3(O\text{—}iC_3H_7)$, $TiCl_2(OC_2H_5)_2$, $TiCl_2(O\text{—}iC_3H_7)_2$, $TiCl_2(O\text{—}CH_2C_6H_5)_2$, $TiCl(OC_2H_5)_3$, $Ti(OC_2H_5)_4$ and $ZrCl_4$. $TiCl_4$ is very particularly preferred.

In the reaction described above, the titanium or zirconium compound is used in an amount of 0.5 to 5 mol, preferably 0.8 to 2.5 mol and especially 1 mol, based on one gram atom of magnesium in the support in the form of spherical particles. The reaction temperature is 20° to 180° C., preferably 60° to 100° C., and the reaction time is 30 min to several hours, preferably 1 to 2 hours, depending on the required titanium or zirconium coating.

Soluble components, such as metal compounds or halogen compounds, are finally removed from the catalyst component A prepared in this way by repeated washing with an inert hydrocarbon at a temperature of 0° to 100° C., preferably of 10° to 60° C.

The catalyst component A prepared according to the invention is in the form of spherical particles whose average diameter is 20 to 150 μm, preferably 40 to 80 μm, and which have a ratio of mass-average diameter, $D_m$, to number-average diameter, $D_n$, of less than 1.5, preferably 1.02 to 1.3.

To increase the mechanical stability, the catalyst component A can be subjected to a prepolymerization before the actual polymerization. This is done by transferring the catalyst component A to a reactor already containing a suspending agent and aluminum alkyl.

A saturated hydrocarbon having 3 to 15 carbon atoms is used as the suspending agent, examples being propane, butane, pentane, hexane, heptane, octane, nonane, decane, cyclohexane or mixtures of such compounds or isomers thereof.

The aluminum alkyl has 1 to 20 carbon atoms in the alkyl radicals, as described under component B.

The prepolymerization is carried out at a temperature of 50° to 110° C., preferably 50° to 95° C., and at a pressure of 0.5 to 20 bar, preferably 0.5 to 8 bar, for a period of 0.5 to 6 h, preferably 0.5 to 1.5 h.

Component A is used for the polymerization of alphaolefins in the form of a suspension in an inert hydrocarbon, or dry after separation of the suspending agent, or as a prepolymer. Preference is given to the polymerization of ethylene or propylene, or the copolymerization of ethylene with propylene, or the copolymerization of ethylene or propylene with an alphaolefin having 4 to 10 carbon atoms and one or more double bonds, e.g. but-1-ene, isobutene, 4-methylpentene, hex-1-ene or buta-1,3-diene.

The polymerization is carried out either continuously or batchwise in suspension in a saturated hydrocarbon having 3 to 15 carbon atoms, e.g. propane, butanes, pentanes, hexanes, heptanes, octanes, nonanes, cyclohexanes or mixtures of such compounds, or continuously in the gas phase. Polymerization in the gas phase is preferred.

Hydrogen is generally used as a molar mass regulator.

An organometallic compound from groups I to III of the periodic table is used as component B (cocatalyst). It is preferable to use an aluminum compound of the formula $AlR^6_pY_{3-p}$, wherein p is 1, 2 or 3, $R^6$ is an alkyl or aryl radical having 1 to 20 carbon atoms and Y is hydrogen, a halogen atom or an alkoxy or aryloxy group having 1 to 20 carbon atoms in each case.

Examples are aluminum trialkyls or aluminum alkyl hydrides and also halogen-containing organoaluminum compounds such as aluminum dialkyl halides, aluminum alkyl dihalides or aluminum alkyl sesquichlorides, which can be used on their own or in a mixture. It is particularly preferable to use chlorine-free compounds as the organoaluminum compounds. On the one hand, suitable chlorine-free organoaluminum compounds are aluminum trialkyls $AlR^6_3$ or aluminum dialkyl hydrides of the formula $AlR^6_2H$, in which $R^6$ is an alkyl radical having 1 to 20 carbon atoms, examples being $Al(CH_3)_3$, $Al(C_2H_5)_3$, $Al(C_2H_5)_2H$, $Al(C_3H_7)_3$, $Al(C_3H_7)_2H$, $Al(iC_4H_9)_3$, $Al(iC_4H_9)_2H$, $Al(C_8H_{17})_3$, $Al(C_{12}H_{25})_3$, $Al(C_2H_5)(C_{12}H_{25})_2$ and $Al(iC_4H_9)(C_{12}H_{25})_2$.

On the other hand, further suitable chlorine-free organoaluminum compounds are the reaction products of aluminum trialkyls or aluminum dialkylhydrides having hydrocarbon radicals containing 1 to 6 carbon atoms, preferably $Al(iC_4H_9)_3$ or $Al(iC_4H_9)_2H$, with diolefins containing 4 to 20 carbon atoms, preferably isoprene. Aluminum isoprenyl may be mentioned as an example.

It is also possible to use mixtures of organometallic compounds of groups I to III of the periodic table, especially mixtures of different organoaluminum compounds.

The following mixtures may be mentioned as examples: $Al(C_2H_5)_3$ and $Al(iC_4H_9)_3$, $Al(C_2H_5)_2Cl$ and $Al(C_8H_{17})_3$, $Al(C_2H_5)_3$ and $Al(C_8H_{17})_3$, $Al(C_4H_9)_2H$ and $Al(C_8H_{17})_3$, $Al(C_4H_9)_3$ and $Al(C_8H_{17})_3$, $Al(C_2H_5)_3$ and $Al(C_{12}H_{25})_3$, $Al(C_4H_9)_3$ and $Al(C_{12}H_{25})_3$, $Al(C_2H_5)_3$ and $Al(C_{16}H_{33})_3$, $Al(C_3H_7)_3$ and $Al(C_{18}H_{37})_2(iC_4H_9)$ and aluminum isoprenyl (reaction product of isoprene with $Al(iC_4H_9)_3$ or $Al(iC_4H_9)_2H$).

Component A can be reacted directly as a suspension with component B; however, it can first be isolated as a solid, stored and resuspended for further use at a later stage.

The mixing of component A and component B can take place before the polymerization in a stirred tank at a temperature of −30° to 150° C., preferably −10° to 120° C. It is also possible directly to combine the two components in the polymerization tank at a polymerization temperature of 20° to 150° C. However, as an alternative, component B can be added in two steps, component A being reacted, before the polymerization reaction, with part of component B at a temperature of −30° to 150° C. and the remainder of component B being added to the polymerization reactor at a temperature of 20° to 200° C.

The polymerization temperature is 50° to 150° C., preferably 50° to 100° C., and the pressure is 1 to 40 bar, preferably 3 to 25 bar.

It is particularly advantageous to use the above-described catalyst in the gas phase polymerization process illustrated in the Figures.

The reference numbers have the following meanings:

| (1)  | reactor or first reactor | (2)  | second reactor |
|------|--------------------------|------|----------------|
| (11) | gas diffuser             | (21) | gas diffuser   |
| (12) | fluidized bed            | (22) | fluidized bed  |
| (13) | recycle gas line         | (23) | recycle gas line |
| (14) | compressor               | (24) | compressor     |
| (15) | heat exchanger           | (25) | heat exchanger |
| (16) | feed line                | (26) | feed line      |
| (17) | off-gas line             | (27) | off-gas line   |
| (18) | feed line                |      |                |
| (19) | discharge line           | (29) | discharge line |
| (3)  | storage bin              | [41] | level measurement |
| (31) | shut-off device          | [42] | pressure measurement |
| (32) | take-off line            | [43] | temperature measurement |
| (33) | feed line                | [44] | differential pressure measurement |
| (34) | outlet line              | [45] | volumetric flow measurement |
| (35) | shut-off device          | [46] | gas analysis   |

Figure 1:
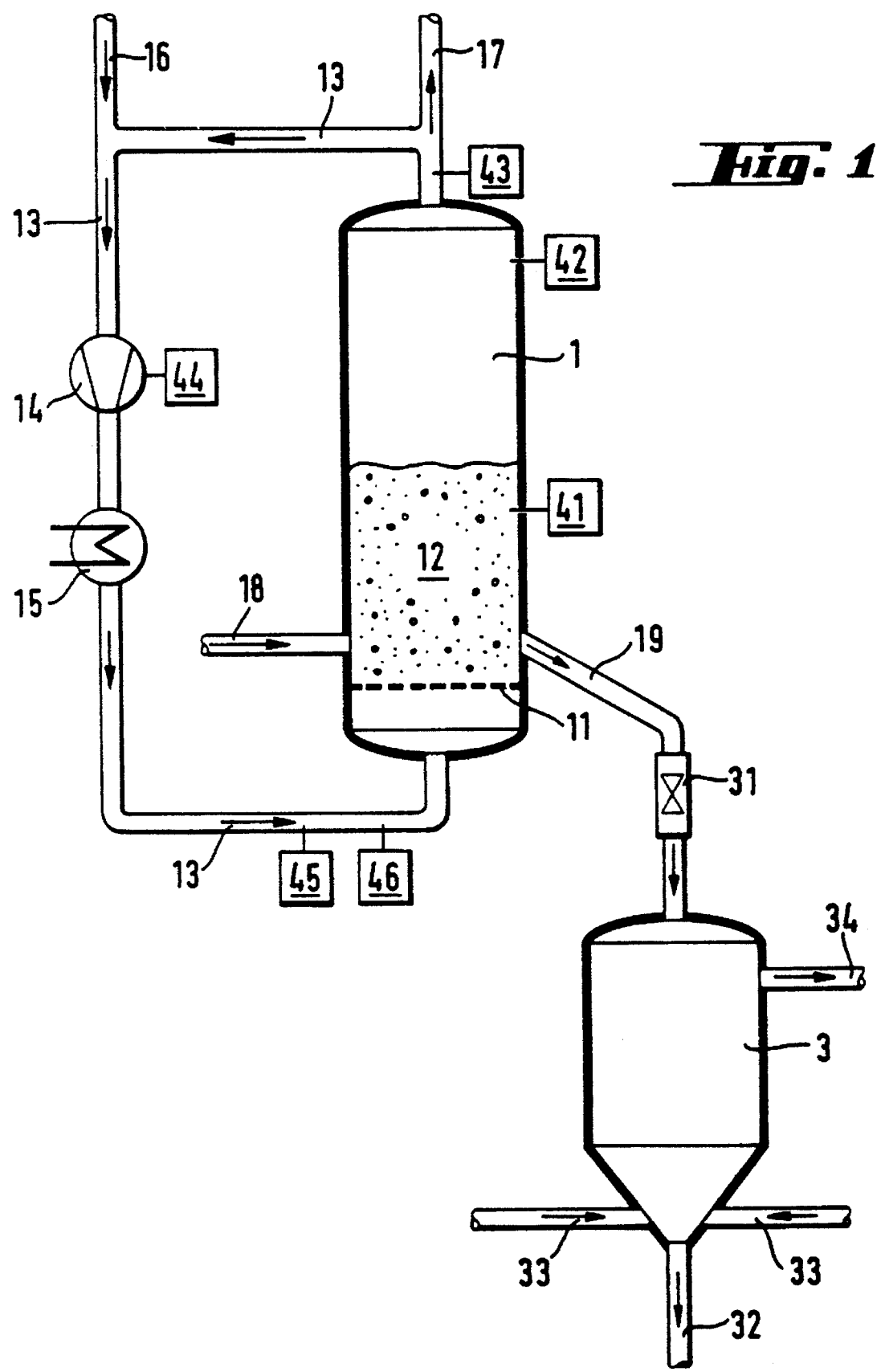
FIG. 1 shows the apparatus used for a one-stage polymerization process.

FIG. 1 shows the apparatus used for a one-stage polymerization process. The reactor (1) with gas diffuser (11) is provided with a recycle gas line (13). Located in this recycle gas line (13) are a compressor (14) and a heat exchanger (15) downstream. Upstream of the compressor (14), a feed line (16) leads into the recycle gas line (13). Another feed line (18) leads into the reactor (1). At the top of the reactor (1), there is an off-gas line (17) in the recycle gas line (13). The reactor (1) can be emptied via the discharge line (19) and the shut-off device (31) into a storage bin (3), which is provided with a take-off line (32). The storage bin (3) can be flushed with an inert gas via the feed lines (33) and the outlet line (34). The apparatus is equipped with devices for level measurement [41], pressure measurement [42], temperature measurement [43], differential pressure measurement [44], volumetric flow measurement [45] and determination of the gas composition (gas analysis) [46].

Figure 2:
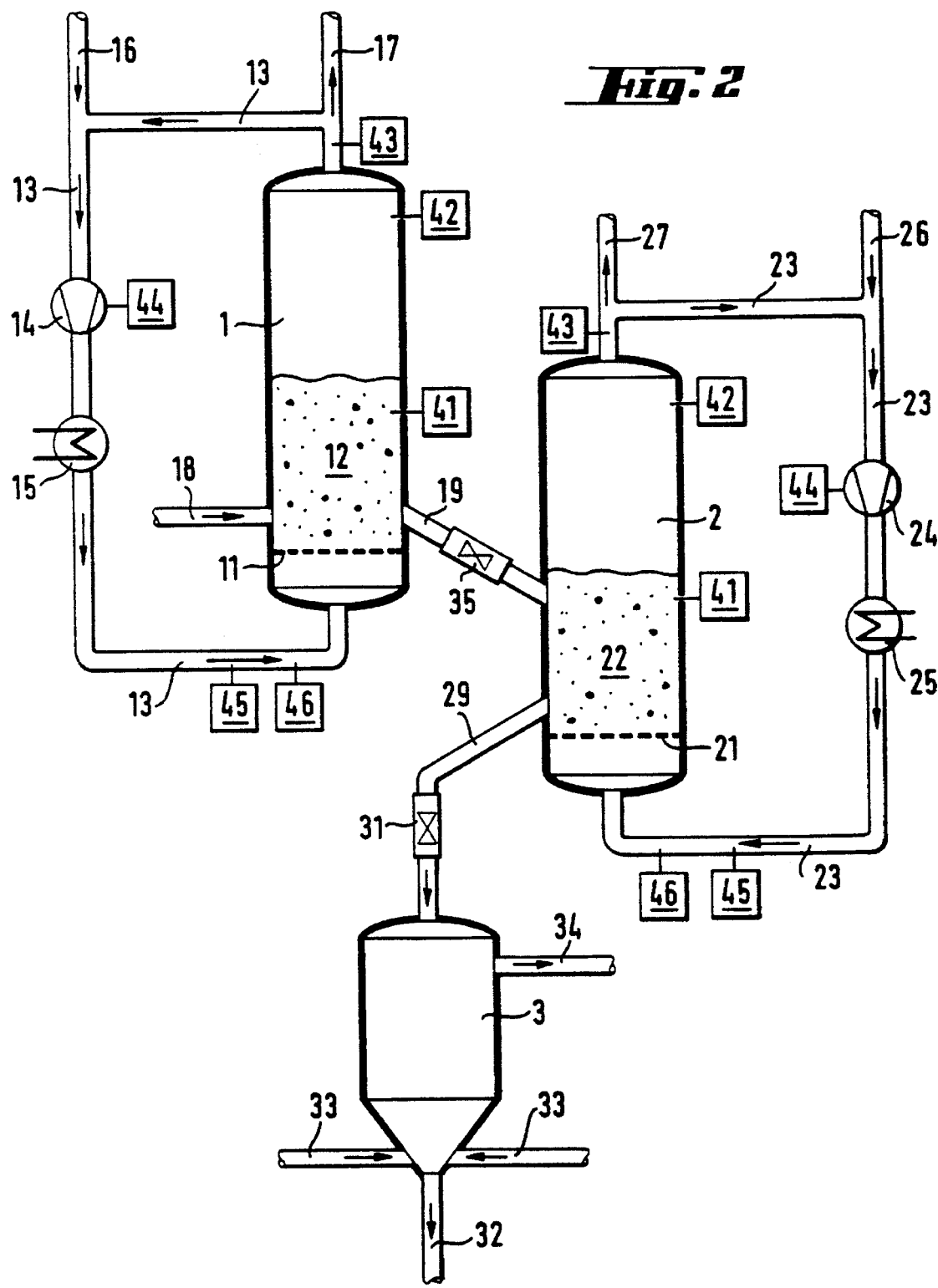
FIG. 2 shows the apparatus used for a two-stage polymerization process.

FIG. 2 shows the apparatus used for a two-stage polymerization process. The apparatus described in FIG. 1 is extended with a second reactor (2) with gas diffuser (21), which is joined to the reactor (1) by the discharge line (19). The reactor (2) is provided with a recycle gas line (23), which includes a compressor (24) and a heat exchanger (25) downstream. Upstream of the compressor (24), a feed line (26) leads into the recycle gas line (23) and, at the top of the reactor (2), there is an off-gas line (27). The reactor (2) can be emptied into the storage bin (3) via a discharge line (29) with shut-off device (31). The second reactor is also equipped with devices for level measurement [41], pressure measurement [42], temperature measurement [43], differential pressure measurement [44], volumetric flow measurement [45] and determination of the gas composition (gas analysis) [46].

A coarse-grained fluidized bed (12) made up of spherical particles is introduced into the reactor (1). Near the bottom of the reactor, there is the gas diffuser (11), which in the rest state supports the fluidized bed (12) and in the operating state is permeable to the fine-grained polymer contained in the fluidizing gas (recycle gas). The reaction gas is led under the gas diffuser (11) through the recycle gas line (13) and, after passing through the gas diffuser (11), completely fluidizes the fluidized bed (12). However, the thorough mixing of the fluidized bed (12) by the recycle gas can also take place below the so-called "whirl point". The reactor (1) can additionally be equipped with a stirring device, which can also be wall-mounted. The recycle gas stream is produced by a compressor (14). The heat of polymerization is dissipated through a heat exchanger (15).

The catalyst, as a dry solid, or suspended in a low-boiling hydrocarbon such as propane, butane or pentane, or as a paste, is metered in laterally through the feed line (18) above the gas diffuser (11). The catalyst is preferably fed in below the surface of the fluidized bed (12). The catalyst feed line (18) can be flushed with an inert gas.

The reactants, i.e. ethylene, hydrogen, comonomer (for example propylene, butene, methylpentene, hexene) and cocatalyst (for example aluminum triethyl, aluminum isoprenyl, aluminum triisobutyl, aluminum ethyl sesquichloride), as well as the auxiliary substance, i.e. nitrogen, are introduced into the recycle gas through the line (16) upstream of the compressor (14). Off-gas is withdrawn through the line (17). If necessary, the off-gas flow can be controlled by a regulator.

All the experimental values measured on the apparatus can advantageously be fed into a process guiding system and used for process control.

The free-flowing polymer powder is discharged via a discharge line (19) into a storage bin (3). The discharge line (19) includes a shut-off device (31), which can be made up of a sluice or of two valves connected in series and operating in a phased manner, so the discharge can take place continuously or quasi-continuously. By having a sufficient slope, the discharge line (19) takes the form of a downpipe. Through the feed lines (33) and the outlet line (34), the storage bin (3) can be flushed with an inert gas, for example nitrogen, in order to remove the monomer from the product. This makes it possible continuously to handle the product and flush it with the inert gas.

The process can be operated in one stage (FIG. 1) or several stages (FIG. 2). FIG. 2 schematically shows the two-stage mode of operation. As is evident from the diagram, the individual stages of the multistage procedure correspond essentially to the one-stage process. The product from the first stage passes via the line (19) and a shut-off device (35) (which corresponds to the shut-off device (31)) into the fluidized bed (22) in the reactor (2). In contrast to the first stage, no catalyst is metered in here. The discharge line (29) takes the form of a downpipe and leads the polymer into the storage bin (3). In this case, the line (29) includes the shut-off device (31).

Due to the use of shock waves as the method of mixing the reactants, the particles of the polymers and copolymers prepared by the process according to the invention are distinguished by a compact, uniform spherical shape with a very narrow size distribution. The ratio of mass-average diameter, $D_m$, to number-average diameter, $D_n$, is less than 1.5, preferably from 1.02 to 1.3. The diameter of the polymer particle is in the range 100 to 1500 μm, preferably 300 to 1000 μm. The polymers have a high bulk density.

A further advantage of the catalyst to be used according to the invention is its high activity, which is such that only very small amounts of catalyst are required for the polymerization. This also makes it unnecessary to subject the polymers to an additional aftertreatment, for example expensive washing or purification operations.

Furthermore, undesired discolorations of the product due to catalyst residues do not arise.

The residual content of titanium and/or zirconium in the polymers prepared according to the invention is less than 10 ppm, preferably less than 3 ppm.

By virtue of its good responsiveness to hydrogen, the catalyst is suitable for the preparation of polymers with a broad bimodal molar mass distribution, particularly in two-stage processes.

The replacement of sulfur-containing electron donors such as diethyl sulfite with alcohols such as ethanol has the effect of eliminating the odor nuisance and increasing the number of possible uses of the polymer.

Considerable simplifications and advantages in handling, drying and processing are achieved as a result of the spherical shape of the particles and the very good flowability of the polymers and copolymers which is associated therewith.

The invention is illustrated in greater detail below by means of the Examples.

The melt flow index MFI (190/5) was determined according to DIN 53735 at 190° C. and under a load of 5 kg.

The ratio of $D_m$ to $D_n$ was determined according to NF X 11-630 of June 1981:

$D_m = [\Sigma n_i(D_i)^3 D_i]/[\Sigma n_i(D_i)^3]$
$D_n = [\Sigma n_i D_i]/\Sigma n_i$
$n_i$=number of samples of the same diameter
$D_i$=diameter of the ith sample The particle size distribution $D_m/D_n$ of component A was determined by means of image analysis.

EXAMPLE 1

306 cm³ of a heptane solution of magnesium butyl octyl (285 mmol of Mg) of approximate composition [(n-$C_4H_9)_{1.5}$(n-$C_8H_{17})_{0.5}$Mg], which is commercially available under the name ®BOMAG-A, were agitated by means of shock waves (®Vibromischer E1, Chemlab GmbH) rather than a stirrer. 27.7 cm³ (285 mmol) of $CCl_4$ in 140 cm³ of benzine (boiling range 100°/120° C.) were added over 90 min at a temperature of 70° to 80° C. The reaction medium was then mixed thoroughly for 120 min at 85° C. by means of shock waves. A mixture of 7.6 cm³ (130 mmol) of absolute ethanol and 8.4 cm³ of benzine (boiling range 100°/120° C.) was added to the resulting suspension over 5 minutes at a temperature of 85° C. and the reaction medium was then mixed thoroughly for one hour at 85° C. by means of shock waves. 18.9 cm³ (171 mmol) of $TiCl_4$ were then added dropwise over 10 minutes at a temperature of 93° to 97° C. The suspension was mixed for two hours at 98° C. by means of shock waves and then washed with 6×700 cm³ of benzine (boiling range 100°/120° C.) at 50° to 60° C. Analysis showed magnesium:titanium:chlorine proportions of Mg:Ti:Cl=1:0.041:2.14. $D_m/D_n$=1.13.

EXAMPLE 2

A solution of 49 cm³ (605 mmol) of $CHCl_3$ in 140 cm³ of benzine (boiling range 100°/120° C.) was added to 306 cm³ of a heptane solution of magnesium butyl octyl (285 mmol of Mg; as in Example 1) over 90 min and the reaction medium was then mixed thoroughly for a further 120 min at 75° to 77° C. by means of shock waves. A mixture of 3.6 cm³ (62 mmol) of absolute ethanol and 12.4 cm³ of benzine (boiling range 100°/120° C.) was added to the resulting suspension over 15 minutes at 85° C. and the reaction medium was then mixed thoroughly for one hour at 85° C. by means of shock waves. 31.4 cm³ (285 mmol) of $TiCl_4$ were then added dropwise over 25 minutes at a temperature of 85° C. The suspension was mixed thoroughly for 2 hours at 94° C. by means of shock waves and then washed with 6×700 cm³ of benzine (boiling range 100°/120° C.) at 50° to 60° C. Analysis showed magnesium:titanium:chlorine proportions of Mg:Ti:Cl=1:0.059:2.17. $D_m/D_n$=1.09.

EXAMPLE 3

The procedure was analogous to Example 2 except that 62 mmol of n-butanol were used instead of absolute ethanol. Analysis showed magnesium:titanium:chlorine proportions of Mg:Ti:Cl=1:0.41:2.19. $D_m/D_n$=1.09.

EXAMPLE 4

The procedure was analogous to Example 2 except that 26.2 cm³ (125 mmol) of tetraethyl orthotitanate were added instead of ethanol. Analysis showed magnesium:titanium:chlorine proportions of Mg:Ti:Cl=1:0.044:2.19. $D_m/D_n$=1.04.

EXAMPLE 5

690 cm³ of benzine (boiling range 100°/120° C.), 20 mmol of aluminum triethyl and 93.2 cm³ (corresponding to 10 mmol of titanium) of the catalyst suspension from Example 3 were placed in a 1.5 dm³ steel autoclave. A pressure of 2 bar of argon and 1.1 bar of hydrogen was then applied and, after the addition of ethylene, the prepolymerization took place over one hour at a total pressure of 6 bar and at a temperature of 65° C.

EXAMPLES 6 TO 12

An ethylene polymerization was carried out according to the Table in a 1.5 dm³ steel autoclave at a temperature of 85° C. and at a pressure of 6 bar in 800 cm³ of benzine (boiling range 100°/120° C.). Either 1 mmol of aluminum triethyl (ATE) or 5 mmol of aluminum triisobutyl (ATIB) were added as component B. The proportion of polymer particles of <100 μm was <0.1%.

TABLE

| | Ethylene polymerization | | | | | | |
|---|---|---|---|---|---|---|---|
| Ex. | Comp. A according to Ex. | Comp. B | H₂ bar | Yield g PE/ mmol Ti | MFI 190/5 g/10' | $d_{50}$ μm | BD g/l |
| 6 | 1 | ATE | 3.9 | 29,200 | 10.4 | 630 | 320 |
| 7 | 1 | ATIB | 1.5 | 55,800 | 0.06 | 1230 | 300 |
| 8 | 2 | ATIB | 3.9 | 25,800 | 11.6 | 570 | 330 |
| 9 | 3 | ATIB | 2.0 | 35,300 | 1.1 | 750 | 300 |
| 10 | 3 | ATE | 3.9 | 23,200 | 10.8 | 590 | 320 |
| 11 | 4 | ATIC | 3.9 | 9,800 | 19.0 | 680 | 290 |
| 12 | 5 | ATIB | 2.1 | 33,800 | 0.8 | 820 | 310 |

EXAMPLE 13

The apparatus illustrated schematically in FIG. 1 was used for gas phase polymerization. Before the start of the reaction, the reactor was filled with 20 kg of polyethylene having an average particle diameter of 500 μm. 45 m³/h of a gas mixture were passed upwards through the fixed bed at 80° C. and 20 bar. The gas mixture was composed of ethylene, hydrogen and nitrogen. The reactor was charged continuously with 2 kg/h of ethylene and with catalyst, the catalyst from Example 2 being subjected to a prepolymerization analogously to Example 8. The amount of catalyst was regulated to keep the ethylene partial pressure constant. The metering of the hydrogen—as a molar mass regulator—was regulated to keep the ratio of the partial pressures of ethylene and hydrogen constant. In addition to the catalyst, aluminum triethyl was metered in as a cocatalyst in a ratio Al/Ti of 200:1. The polymer obtained under these conditions had an MFI 190/5 of 3 g/10 min, a $d_{50}$ value of 600 μm, a proportion with $d_{50}$<200 μm of less than 2% and a bulk density of 500 g/dm³.

We claim:

1. A process for the preparation of a polyolefin by the polymerization of an alpha-olefin at a temperature of 50° to 150° C. and at a pressure of 1 to 40 bar, in the presence of a catalyst composed of a transition metal component (component A) and an organometallic compound (component B), wherein component A has been prepared by a) reacting an organomagnesium compound of the formula $R^1_xMgR^2_{2-x}$, wherein $R^1$ and $R^2$ are identical or different alkyl radicals having 2 to 12 carbon atoms and x is a number from 0 to 2, with a primary aliphatic chlorohydrocarbon in an amount of 0.5 to 2.5 mol of chlorohydrocarbon, based on 1 mol of organomagnesium compound, optionally in the presence of an organoaluminum compound of the formula $AlR^3_n(OR^4)_{3-n}$, wherein $R^3$ and $R^4$ are identical or different alkyl radicals having 1 to 8 carbon atoms and n is 0, 1, 2 or 3, or in the presence of the reaction product of aluminum trialkyls or aluminum dialkyl hydrides with diolefins containing 4 to 20 carbon atoms, at a temperature of 30° to 110° C., b) treating the resulting solid with an alcohol in an amount of 0.001 to 1 mol per gram atom of magnesium contained in the solid, at a temperature of −20° to 150° C., and c) reacting the resulting support with one or more compounds of the formula $M^1X_m(OR^5)_{4-m}$, wherein $M^1$ is titanium or zirconium, $R^5$ is an alkyl radical having 2 to 10 carbon atoms, X is a halogen atom and m is an integer from 0 to 4, in an amount of 0.1 to 5 mol per gram atom of magnesium contained in the support, at a temperature of 20° to 180° C., a device for producing shock waves being used instead of a stirrer in steps a), b) and c) for the thorough mixing of the reactants.

2. The process as claimed in claim 1, wherein a magnesium dialkyl of the formula $[(n-C_4H_9)_{1.2-1.7}(n-C_8H_{17})_{0.3-0.8}Mg]$ has been used.

3. The process as claimed in claim 1, wherein ethanol or n-butanol has been used as the alcohol.

4. The process as claimed in claim 1, wherein $TiCl_4$ has been used as the compound of the formula $M^1X_m(OR^5)_{4-m}$, wherein $M^1$, $R^5$ and m are as defined in claim 1.

5. The process as claimed in claim 1, wherein step b is omitted.

6. The process as claimed in claim 1, wherein the catalyst component A has been subjected to a prepolymerization.

7. The process as claimed in claim 1, wherein the polymerization takes place continuously in one or more stages in a gas phase process.

8. A process for the preparation of a polyolefin by the polymerization of an alpha-olefin at a temperature of 50° to 150° C. and at a pressure of 1 to 40 bar, in one or more stages in a gas phase process, wherein the apparatus in the case of a one-stage process comprises a reactor with a gas diffuser and a recycle gas line, which includes a compressor and a heat exchanger downstream, a feed line leads into the recycle gas line upstream of the compressor, another feed line leads into the reactor, there is an off-gas line in the recycle gas line at the top of the reactor, and the reactor can be emptied via a discharge line and a shut-off device into a storage bin, which is provided with a take-off line, and the apparatus in the case of a two-stage process is extended with a second reactor with gas diffuser, which is joined to the reactor by the discharge line, the reactor is provided with a recycle gas line, which includes a compresser and a heat exchanger downstream, a feed line leads into the recycle gas line upstream of the compressor, there is an off-gas line at the top of the reactor, and the reactor can be emptied via a discharge line with shut-off device into the storage bin, and the polymerization is carried out in the presence of a catalyst composed of a transition metal component (component A) and an organometallic compound (component B), wherein component A has been prepared by (a) reacting an organomagnesium compound of the formula $R^1_xMgR^2_{2-x}$, wherein $R^1$ and $R^2$ are identical or different alkyl radicals having 2 to 12 carbon atoms and x is a number from 0 to 1, with a primary aliphatic chlorohydrocarbon in an amount of 0.5 to 2.5 mol of chlorohydrocarbon, based on 1 mol of organomagnesium compound, optionally in the presence of an organoaluminum compound of the formula $AlR^3_n(OR^4)_{3-n}$, wherein $R^3$ and $R^4$ are identical or different alkyl radicals having 1 to 8 carbon atoms and n is 0, 1, 2 or 3, or in the presence of the reaction product of aluminum trialkyls or aluminum dialkyl hydrides with diolefins containing 4 to 20 carbon atoms, at a temperature of 30° to 110° C., b) treating the resulting solid with an alcohol in an amount of 0.001 to 1 mol per gram atom of magnesium contained in the solid, at a temperature of −20° to 150° C., and c) reacting the resulting support with one or more compounds of the formula $M^1X_m(OR^5)_{4-m}$, wherein $M^1$ is titanium or zirconium, $R^5$ is an alkyl radical having 2 to 10 carbon atoms, X is a halogen atom and m is an integer from 0 to 4, in an amount of 0.1 to 5 mol per gram atom of magnesium contained in the support, at a temperature of 20 to 180 C., a device for producing shock waves being used instead of a stirrer in steps a), b) and c) for the thorough mixing of the reactants.

9. The process as claimed in claim 1, wherein said device for producing shock waves is a shock wave generator.

10. The process as claimed in claim 9, wherein said organomagnesium compound is selected from the group consisting of magnesium di-n-butyl, magnesium di-n-octyl, magnesium n-butyl n-octyl, magnesium n-butyl ethyl and magnesium n-butyl sec-butyl or mixtures of these compounds.

11. The process as claimed in claim 10, wherein said organomagnesium compound is $[(n-C_4H_9)_{1.5}(n-C_8H_{17})_{0.5}Mg]$.

12. The process as claimed in claim 1, wherein step a) is at a temperature of 40° to 80° C.

13. The process as claimed in claim 12, wherein step a) is treated with shock waves for 30 minutes to 5 hours.

14. The process as claimed in claim 13, wherein step b) the alcohol is in an amount from 0.01 to 0.5 mol per gram atom of magnesium contained in the solid at a temperature from 20° to 90° C. for a time from 0.1 to 3 hours.

15. The process as claimed in claim 14, wherein the catalyst component A) is in the form of spherical particles whose average diameter is 20 to 150 μm and which have a ratio of mass-average diameter, $D_m$, to number-average diameter $D_n$, of less than 1.5.

16. The process as claimed in claim 1, wherein said catalyst component a) is in the form of spherical particles whose average diameter is 40 to 80 μm and which have a ratio of mass-average diameter, $D_m$, to number-average diameter, $D_n$, of 1.02 to 1.3.

17. The process as claimed in claim 8, wherein said device for producing shock waves is a shock wave generator.

* * * * *